United States Patent
Stieger et al.

(10) Patent No.: US 10,246,197 B2
(45) Date of Patent: Apr. 2, 2019

(54) AIRCRAFT

(71) Applicant: ROLLS-ROYCE plc, London (GB)

(72) Inventors: Rory D Stieger, Derby (GB); Matthew Moxon, Derby (GB); Mikko Mattila, Helsinki (FI)

(73) Assignee: ROLLS-ROYCE plc, London (GB)

( * ) Notice: Subject to any disclaimer, the term of this patent is extended or adjusted under 35 U.S.C. 154(b) by 75 days.

(21) Appl. No.: 15/280,170

(22) Filed: Sep. 29, 2016

(65) Prior Publication Data

US 2017/0121031 A1    May 4, 2017

(30) Foreign Application Priority Data

Oct. 28, 2015 (GB) .................................. 1519024.2

(51) Int. Cl.
| | | |
|---|---|---|
| *B64D 33/02* | (2006.01) | |
| *B64C 21/06* | (2006.01) | |
| *B64D 27/02* | (2006.01) | |
| *B64D 27/14* | (2006.01) | |
| *B64C 1/00* | (2006.01) | |

(52) U.S. Cl.
CPC ............ *B64D 33/02* (2013.01); *B64C 1/0009* (2013.01); *B64C 21/06* (2013.01); *B64D 27/02* (2013.01); *B64D 27/14* (2013.01); *B64C 2230/04* (2013.01); *B64D 2033/0226* (2013.01); *Y02T 50/12* (2013.01); *Y02T 50/166* (2013.01)

(58) Field of Classification Search
CPC ........ B64D 33/02; B64D 27/14; B64D 27/02; B64D 2033/0226; B64C 21/06; B64C 2230/04
See application file for complete search history.

(56) References Cited

U.S. PATENT DOCUMENTS

| | | | | |
|---|---|---|---|---|
| 2003/0168552 A1* | 9/2003 | Brown | ................. | B64C 11/46 244/55 |
| 2013/0315701 A1* | 11/2013 | Neuteboom | ............ | B64C 11/48 415/1 |
| 2018/0037332 A1* | 2/2018 | Hughes | .................. | B64D 27/24 |

FOREIGN PATENT DOCUMENTS

| | | |
|---|---|---|
| GB | 974384 A | 11/1964 |
| GB | 2120623 A | 12/1983 |

OTHER PUBLICATIONS

Apr. 13, 2016 Search Report issued in Great Britain Patent Application No. 1519024.2.

J. I. Hileman et al., "Airframe Design for "Silent Aircraft,""American Instiute of Aeronautics and Astronautics, 2007, pp. 1-15, The Cambridge-MIT Institute, 45th AIAA Aerospace Sciences Meeting and Exhibit.

Shishir A. Pandya, External Aerodynamics Simulations for the MIT D8 "Double-Bubble" Aircraft Design, pp. 1-16, Seventh International Conference on Computational Fluid Dynamic, ICCFD7-4304, 2012.

* cited by examiner

*Primary Examiner* — Valentina Xavier
(74) *Attorney, Agent, or Firm* — Oliff PLC

(57) ABSTRACT

An aircraft (10) comprising a fuselage (12), the fuselage (10) comprising at least first and second inwardly tapering portions (20, 22) extending in a generally rearward direction from an aft end of the fuselage (12), each inwardly tapering portion (20, 22) comprising a boundary layer ingesting propulsor (36) mounted thereon.

11 Claims, 4 Drawing Sheets

AIRCRAFT

The present disclosure concerns an aircraft, particularly an aircraft having boundary layer ingesting propulsors.

It is known to increase propulsive efficiency of an aircraft by providing propulsors (such as ducted fans or propellers) which ingest boundary layer air. Boundary layer air extends from a wetted surface to a thickness normally defined as the distance from the wetted surface at which the viscous flow velocity is 99% of the freestream velocity (i.e. the surface velocity of an inviscid flow). Consequently, boundary layer air moves more slowly than the freestream flow in the reference frame of the aircraft. As such, where propulsors are configured to ingest boundary layer airflow, the propulsors will accelerate the airflow to a greater extent for the same exhaust velocity compared to propulsors configured to ingest freestream airflow, thereby increasing propulsive efficiency of boundary layer ingesting propulsors.

Aircraft have been proposed which take advantage of these effects by placing one or more propulsors at an aft end of the aircraft. A first example includes the Sax40 proposed by the Silent Aircraft Initiative and described in "Airframe Design for Silent Aircraft", J Hileman, Z Spakovszky, M Drela and M Sargeant, AIAA-2007-0453, 45th AIAA Aerospace Sciences Meeting and Exhibit, Reno, Nev. A second example includes the NASA/MIT D8, described in "External Aerodynamics Simulations for the MIT D8 "Double-Bubble" Aircraft Design", S Pandya, Seventh International Conference on Computational Fluid Dynamics (ICCFD7), Big Island, Hi., Jul. 9-13, 2012.

However, the aerodynamic benefits of such aircraft are relatively small, and generally require multiple large unducted propellers or ducted fans at the rear of a relatively flat portion of the fuselage in order to ingest a sufficiently large quantity of boundary layer air, and so obtain an appreciable benefit (as shown for example in both the Sax40 and the D8). Such an arrangement is inefficient in terms of the use of internal space within the fuselage. Consequently, such aircraft are relatively long, or can carry relatively few passengers for an aircraft of their size. This is especially problematic for large aircraft, whose length is often constrained by airport handling considerations. Furthermore, several previous proposals place the propulsor inlet spaced from a single surface, (such as the top of the fuselage in the D8), resulting in inlet flow distortion at the propulsor inlet face in view of the non-rotationally symmetric flow conditions upstream of the propulsor inlet. Consequently, such an arrangement will require a distortion tolerant fan or propeller, which presents further design challenges, and may result in a propulsor design having increased weight and/or costs.

The present disclosure seeks to provide an aircraft overcoming one or more of these problems.

The term "longitudinal" used herein refers to an axis of the aircraft extending from a nose of the aircraft to a tail of the aircraft. The term "lateral" refers to an axis running perpendicular to the longitudinal axis in the horizontal plane when the aircraft is on the ground or in normal level flight. The term "vertical" refers to an axis relative to when the aircraft is on the ground or in normal level flight.

According to a first aspect of the present disclosure there is provided an aircraft comprising a fuselage, the fuselage comprising at least first and second inwardly tapering portions extending in a generally rearward direction from an aft end of the fuselage, each inwardly tapering portion comprising a boundary layer ingesting propulsor mounted thereon.

By providing at least first and second inwardly tapering portions at an aft end of the fuselage, each having a boundary layer ingesting propulsor mounted thereon, the length of the fuselage can be reduced for a given taper angle of the tapering portion, since each tapering portion starts from a smaller diameter at its respective upstream end. Meanwhile, multiple boundary layer ingesting propulsors can be provided at the aft end of the fuselage, thereby increasing the propulsive efficiency of the aircraft. In general, the tapering angle can in principle also be increased without suffering from boundary layer separation, due a large proportion of the boundary layer being ingested and thereby reaccelerated by the propulsors.

Each of the tapering portions may extend from approximately the same longitudinal position.

The first and second tapering portions may be arranged parallel to one another in substantially the same horizontal plane. Alternatively, the first and second tapering portions may be arranged parallel to one another in substantially the same vertical plane, or in a common longitudinal plane.

Each propulsor may comprise one of a ducted fan and an un-ducted propeller. Each propulsor may be driven by a gas turbine engine. In a first embodiment, each propulsor may be driven by a respective gas turbine engine. In a second embodiment, two or more propulsors may be driven by a common gas turbine engine core. In the second embodiment, each propulsor may be driven by a respective turbine driven by exhaust gases from a common gas generator. In general, large gas turbine engines can be more efficient than small gas turbines. Furthermore, a single large gas turbine engine generally has a lower cost than multiple, smaller gas turbine engines. Consequently, by driving both propulsors with a single gas turbine engine or gas generator, cost and efficiency improvements can be realised. On the other hand, by providing separate gas turbine engines for each propulsor, each propulsor can be controlled independently of the other.

The or each gas turbine engine may comprise a core flow inlet arranged to ingest boundary layer air. Alternatively, the core flow inlet of the or each gas turbine engine may be configured to ingest freestream air. Where the aircraft comprises a plurality of gas turbine engines, a first gas turbine engine may comprise a simple cycle gas turbine engine, and a second gas turbine engine may comprise a recuperated cycle gas turbine engine.

The aircraft may comprise further inwardly tapering portions extending from an aft end of the fuselage comprising a boundary layer ingesting propulsor mounted thereon.

In one embodiment, the aircraft may comprise first, second and third inwardly tapering portions extending from an aft end of the fuselage, each comprising a boundary layer ingesting propulsor mounted thereon, each inwardly extending tapering portion extending from the same longitudinal position.

Each tapering portion may comprise a non-axisymmetric portion upstream of an inlet of the respective propulsor, the non-axisymmetric portion defining a twist in an opposite sense to a rotational direction of the propulsor fan or propeller. Advantageously, the fuselage provides a "pre-swirl" on air entering the propulsor inlet, thereby reducing propulsor exit swirl, and therefore reducing wake drag. Alternatively or in addition, the fuselage may comprise one or more guide vanes upstream of one or more propulsor inlets.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 1:
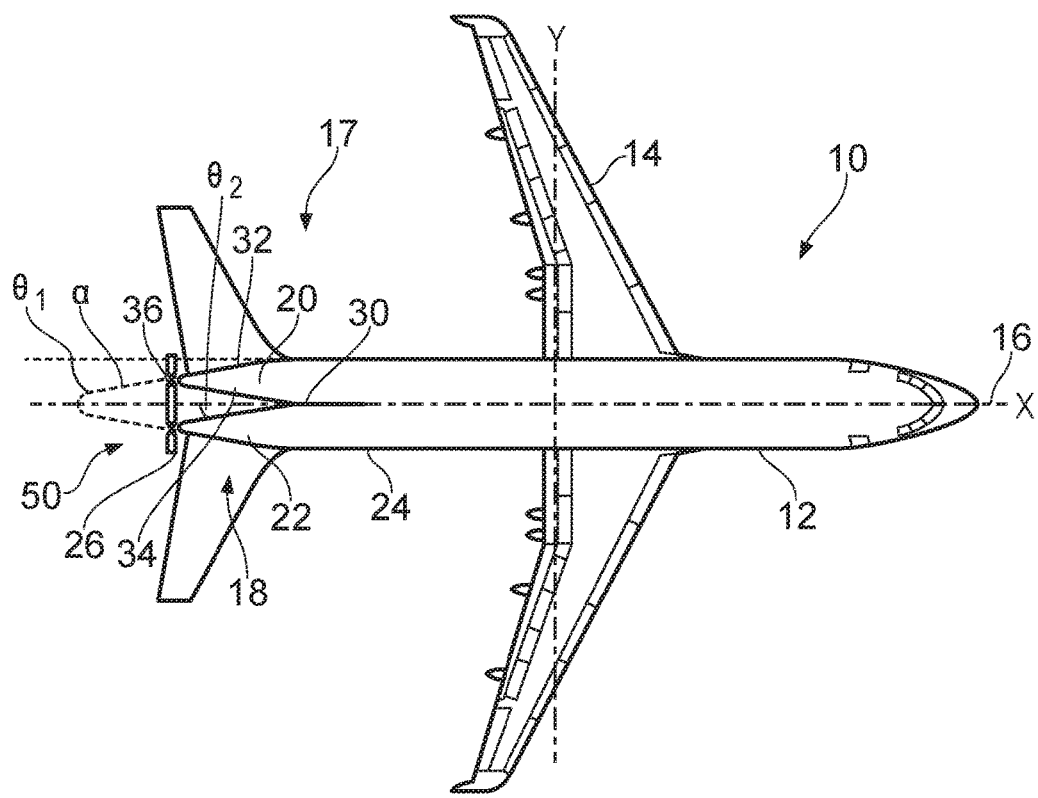
FIG. 1 is a plan view from above of a first aircraft in accordance with the present disclosure.
Figure 2:
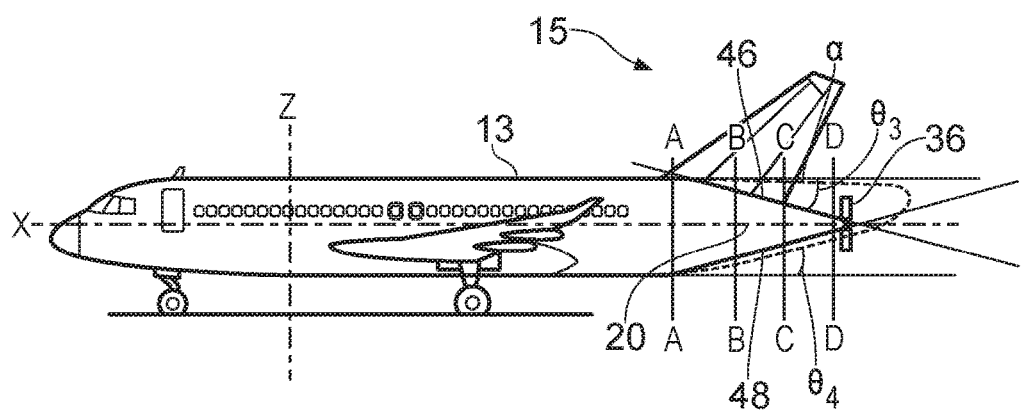
FIG. 2 is a side view of the aircraft of FIG. 1.
Figure 3:
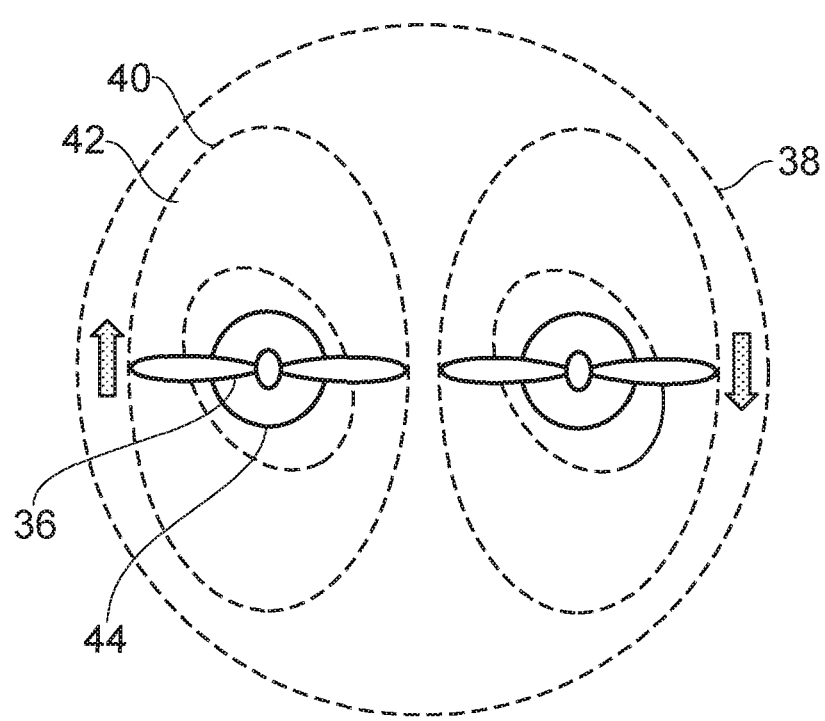
FIG. 3 is a view from an aft end of part of the aircraft of FIG. 1.

With reference to FIGS. 1 to 3, a first aircraft 10 in accordance with the present disclosure comprises a fuselage 12, a pair of wings 14, an empennage including vertical 15 and horizontal 17 tail surfaces and a propulsion arrangement 50. The fuselage 12 defines a nose 16 at a forward end, and a tail 18 at an aft end. A notional line extending horizontally between the nose 16 and tail 18 defines a longitudinal centre line X. A horizontally extending (when the aircraft is on the ground or in level flight) line extending perpendicular to the longitudinal centre line defines a lateral axis Y. The vertical axis is indicated on FIG. 2 as line Z.

The fuselage 12 comprises a main portion 13 and a bifurcation 30 which splits the fuselage 12 into first and second inwardly tapering portions 20, 22 at the tail end 18 through the horizontal plane, i.e. the tail 18 is divided in two when viewed from above or below. Each inwardly tapering portion 20, 22 extends parallel to the other, rearwardly in a generally longitudinal direction from the tail end 18 of the fuselage 12, and extends from a forward end 24 to a rearward end 26. An outwardly facing external surface 32 of the forward end 24 of each tapering portion matches the cross sectional profile of the remainder of the fuselage 12. The surface 32 of each tapering portion 20, 22 tapers inwardly at a first taper angle $\theta_1$ defined by an angle between a notional line extending between the forward end 24 of the surface 32 of the respective tapering portion 20, 22 and the rearward end 26 of the respective tapering portion, and the longitudinal axis X. In one example, the first taper angle $\theta_1$ is approximately 10°. Each inwardly tapering portion 20, 22 is generally straight from the forward end along most of its length, and curves inwardly toward the rearward end where it meets a second, inwardly facing external surface 34, which generally faces the longitudinal centre line X of the aircraft 10. The inwardly facing external surface 34 similarly tapers inwardly from the forward end 24, where it meets a corresponding inwardly facing external surface of the other inwardly tapering portion 20, 22. The surface 34 tapers inwardly at a second taper angle $\theta_2$ defined by an angle between a notional line extending between the forward end 24 of the surface 34 of the respective tapering portion 20, 22 and the rearward end 26 of the respective tapering portion. Generally, the first and second taper angles $\theta_1$, $\theta_2$ will be the same or similar. Generally, the taper angle of the tapering portions will vary across the surface, particular where the aircraft is configured to cruise at transonic speeds, due to the "Area Rule". The Area Rule states that for minimum drag at transonic speeds, the variation of overall cross sectional area of the aircraft should vary in accordance with the Seers-Hack profile. In other words, inward or outward projections at a longitudinal station should be matched with corresponding outward or inward projections at that longitudinal station. Consequently, where the vertical or horizontal surfaces project from the aircraft, the tapering angle may increase at that point along at least part of the circumference, such that the overall cross sectional area continues to smoothly decrease toward the tail.

For comparison, the outline of the tail of a prior aircraft (specifically the Airbus™ A320) is shown as dotted line α. As can be seen, in spite of a substantially similar taper angle in the horizontal axis, the length of the fuselage 12 of the aircraft 10 is reduced compared to the A320. Meanwhile, the length of the constant area, circular cross section main portion 13 of the fuselage 12, in which passengers can be accommodated, remains constant. This is a direct consequence of the provision of the pair of tapering portions 20, 22. This may result in a reduced wetted surface area, and reduced structure, resulting in more payload, and/or higher aerodynamic efficiency, or improved airport ground handling. Alternatively, the circular, constant area main portion 13 can be extended rearwardly, resulting in a longer useful constant fuselage cross section main portion 13 (and so a higher passenger capacity) for the same overall aircraft length. Such an arrangement would be particularly beneficial where the aircraft length is constrained by, for instance, airport handling considerations.

A propulsor in the form of an un-ducted propeller 36 is provided at the aft end of each tapering portion 20, 22. Each propeller 36 has a rotational axis centred at the rearward end 26 of a respective tapering portion 20, 22. In view of the positioning of the propellers 36, at least a portion (in general, the root portion) of the propellers 36 ingest boundary layer airflow in use from the external surfaces 32, 34. Generally, the proportion of boundary airflow ingested by each propeller 36 will depend on forward flight speed of the aircraft 10, and on the particulars of the aircraft configuration. However, in any event, at least the portion of the airflow nearest the root of the propeller 36 would be considered to represent boundary layer airflow when the aircraft is in flight. In view of this boundary layer airflow, the propellers 36 have a higher propulsive efficiency than similar propellers located in freestream flow. In view of the provision of multiple propellers 36, redundancy is provided, thereby ensuring an adequate operational safety margin. In view of the prevision of two propulsors, smaller diameter propellers can be utilised for the same overall propeller area. Consequently, the propellers are at less risk of contact with the ground in the event of over-rotation of the aircraft.

FIG. 2 shows the aircraft of FIG. 1 from a side view. As can be seen, each tapering portion 20, 22 tapers in the vertical axis at both upper 46 and lower 48 external surfaces. The upper surface 46 defines a taper angle $\theta_3$, and the lower surface 48 defines a taper angle $\theta_4$ in a similar manner to the surfaces 32, 34. Again, the outline of an Airbus A320 is shown for comparison by dotted lines α. As can be seen, in the prior aircraft, only the lower surface is significantly tapered, whereas in the embodiment of FIG. 2, both upper and lower surfaces 46, 48 are tapered inwardly toward the tail 18. As can be seen, the lower surface 48 is tapered to a greater extent than in the prior Airbus A320, for reasons that will be explained further below.

FIG. 3 shows the aircraft of FIG. 1 from the tail 18, showing the longitudinal cross section. Dotted lines 38, 40, 42, 44 show cross-section at lines A-A, B-B, C-C, D-D shown in FIG. 2 respectively. As can be seen, the cross-section transforms continuously between a circular profile at section 38 (corresponding to the main body 13, forward of the bifurcation 30) to an elliptical cross section at cross-section 40 (corresponding to a point aft of the forward end 24 of each of the tapered portions 20, 22). At cross section 40, the ellipse defines a long axis extending generally vertically, and a short axis extending generally horizontally. Continuing toward the tail 18, the cross section at 42 continues to taper in both the horizontal and vertical axes. The eccentricity of the ellipse is reduced at cross section 42 relative to cross section 40. The orientation of the long and short axis is also rotated in an anti-clockwise direction when viewed along the longitudinal axis X from the tail 18 at cross section 42, for reasons that will be explained below. Continuing again further aft, the cross section at 44 continues to taper again in both the horizontal and vertical axes, transforming continuously to form a circular cross-section once more where each portion 20, 22 meets an inlet of the respective propeller 36, again for reasons that will be explained below.

The cross sectional variation of each tapering portion 20, 22 along the longitudinal axis X provides for several advantages.

By initially tapering to define a highly elliptical cross section, the initial vertical tapering angles $\theta_3$, $\theta_4$ are limited, thereby preventing flow separation from external surfaces 32, 34 46, 48. By transforming to a circular cross section toward the inlet of the propellers 36, a substantially axisymmetrical boundary layer thickness is presented to the propellers 36. Consequently, relatively limited flow distortion is provided to the propellers 36 in view of the symmetric longitudinal cross section immediately upstream of the propellers 36.

As noted above, the tapering/diffusion angle $\theta$ may be greater on one or more surfaces compared to the prior art. Ordinarily, such an increased taper angle would result in flow separation at the tail, and thereby increased drag. However, the operation of the boundary layer ingesting propellers 36 results in re-acceleration of the boundary layer flow, thereby preventing flow separation. Consequently, the diffusion angle $\theta$ can be increased, without encountering flow separation.

By rotating the long axis of the elliptical cross section in an anti-clockwise direction in the longitudinal direction in an aft direction, swirl is imparted to the air upstream of the propeller 36 inlet. This swirl is then at least partly cancelled by swirl imparted to the airstream by the propellers 36. Consequently, the exit swirl of the airstream at the exhaust of the (in this example, clockwise rotating when viewed from the tail) propellers 36 is reduced, thereby reducing drag.

Figure 4:
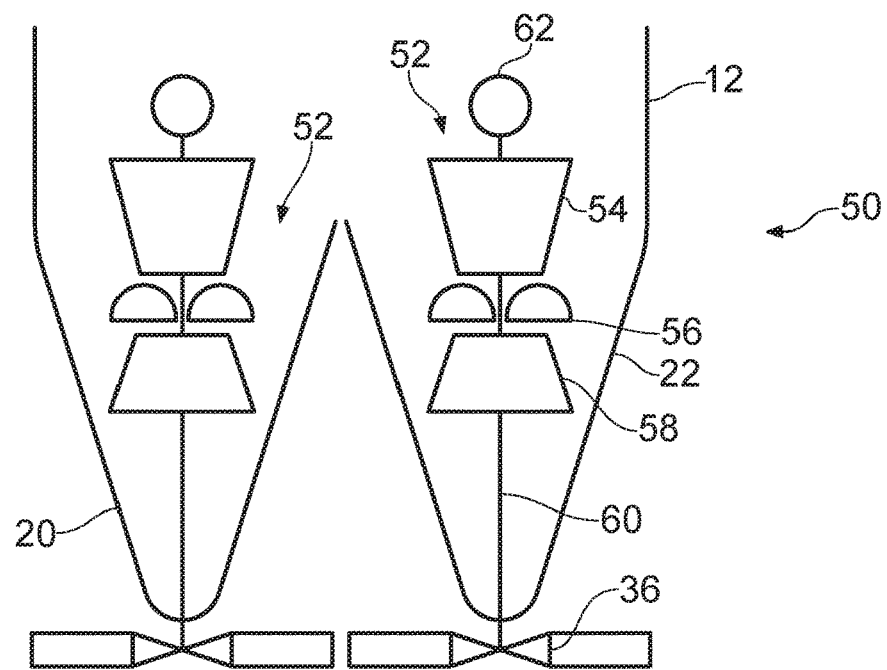
FIG. 4 is a schematic cross sectional view from above of a propulsion arrangement of the aircraft of FIG. 1.

FIG. 4 shows a schematic plan view from above of a first propulsion arrangement 50 for the aircraft shown in FIGS. 1 to 3. The propulsion arrangement includes the propellers 36, and a drive arrangement for driving the propellers 36. The drive arrangement comprises a pair of gas turbine engines 52, each comprising a compressor 54, combustor 56 and turbine 58 in fluid flow relationship. The compressor 54 and turbine 58 of each gas turbine engine 52 is coupled to a respective propeller 36 by a shaft 60. Each gas turbine engine 52 is located within the fuselage 12 at least partially within a respective tapering portion 20, 22. An inlet 62 is provided for each gas turbine 52, configured to provide airflow to the respective compressor 54. Each inlet 62 could be configured to ingest boundary airflow, for example through one of a low profile scoop, and a flush inlet on an external surface of the fuselage 12. In such an arrangement, redundant gas turbines 52 and propellers 36 are provided, thereby providing a high degree of redundancy, and therefore safety.

Figure 5:
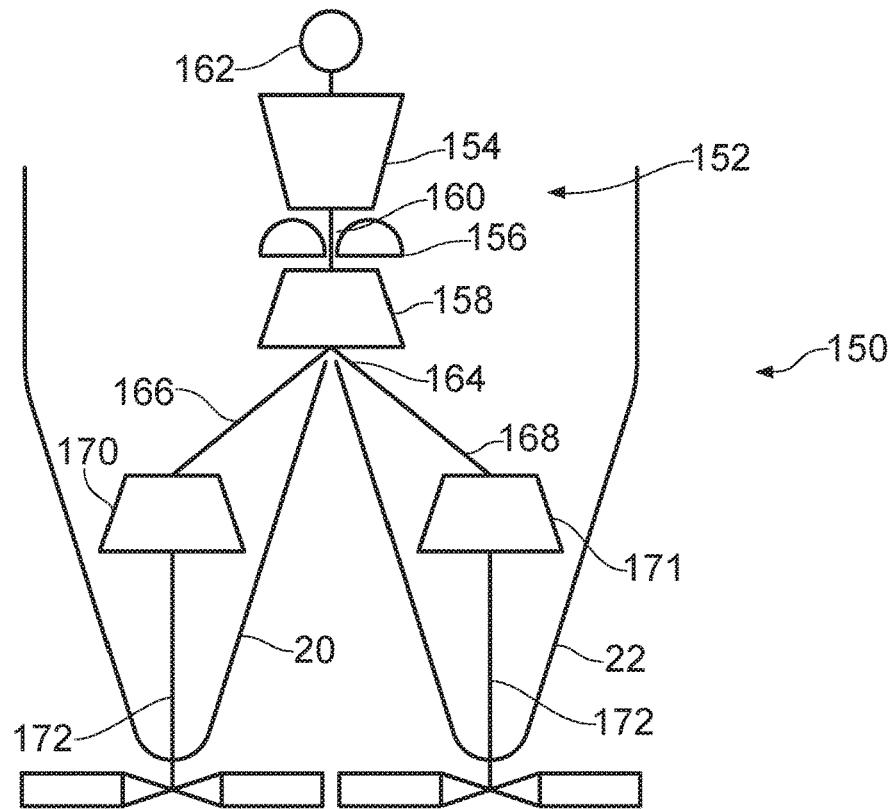
FIG. 5 is similar view to FIG. 4, but of an alternative propulsion arrangement.

FIG. 5 shows an alternative propulsion arrangement 150 for the aircraft shown in FIGS. 1 to 3. In this embodiment, a single gas turbine 152 (again comprising a compressor 154, combustor 156 and first turbine 158 fed by an intake 162) is provided. The compressor 154 and first turbine 158 are coupled by a first shaft 160. The first turbine 158 provides enough power to power the compressor 154, with little power remaining, and with significant heat and pressure remaining in the first turbine 158 exhausts gas flow. Such an arrangement is known as a gas generator. In this embodiment, the gas turbine engine 152 is located within the main portion 13 of the fuselage 12. First and second exhaust passages 164, 166 are provided downstream of the first turbine 158 in fluid communication with an exhaust of the first turbine 158. This exhaust fluid is fed to second and third turbines 170, 171 within respective tapering portions 120, 122, which in turn drive respective propeller drive shafts 172. In such an arrangement, a single gas generator 152 drives both propulsors 36, thereby providing similar propulsive efficiency improvements to the arrangement 150, with greater simplicity. In order to provide greater redundancy, further gas turbine engines (not shown) in the form of turbofans may be provided, located on the wings for example.

Figure 6:
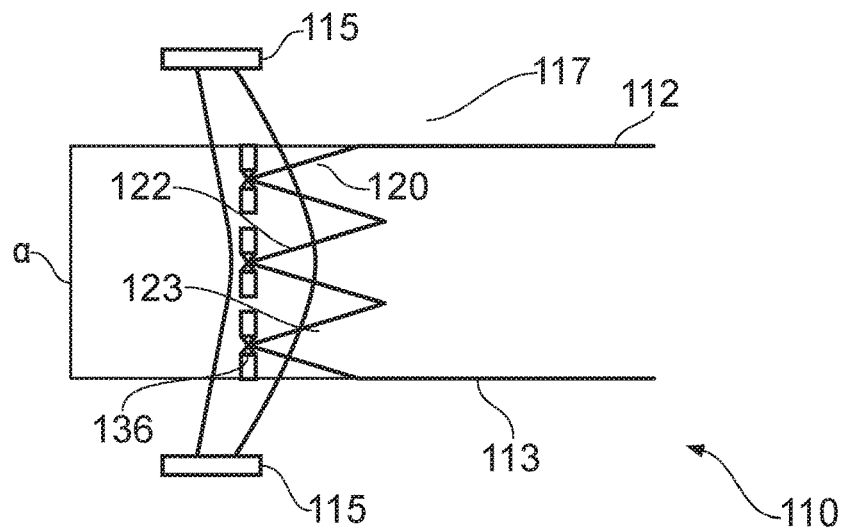
FIG. 6 is a plan view from above of a second aircraft in accordance with the present disclosure.
Figure 7:
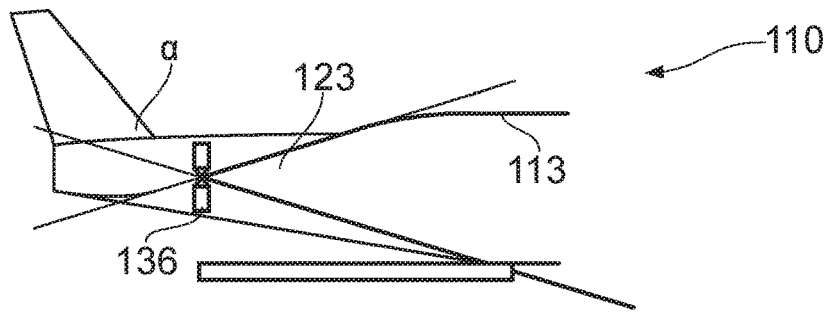
FIG. 7 is a side view of the aircraft of FIG. 6.
Figure 8:
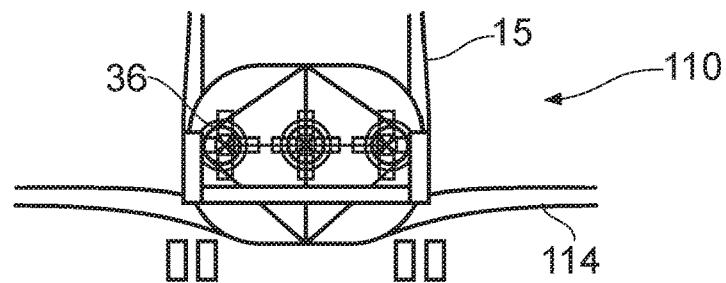
FIG. 8 is a view from an aft end of part of the aircraft of FIG. 6.

FIGS. 6, 7 and 8 show a plan view, a side view and an aft view respectively of an alternative aircraft 110 in accordance with the present disclosure. The aircraft 110 comprises a fuselage 112 and wings 114. The fuselage 112 includes a main portion 113, which has a "double bubble" fuselage cross-section comprising two circular fuselage cross sections in side-by side configuration joined by a connection. Consequently, the fuselage 112 has a relatively wide body, being wider in the horizontal direction than it is tall in the vertical direction. The fuselage 112 has first, second and third tapering portions 120, 122, 123 extending from an aft end of the main portion 113. The tapering portions 120, 122, 123 are similar to the tapering portions 20, 22 of the first aircraft 10, but with three tapering portions being provided instead of two, arranged parallel to one another in the same horizontal plane, extending rearwardly from the tail. Again, a propulsor in the form of a propeller 136 is provided at an aft end of each tapering portion 120, 122, 123. Again, an empennage is provided, in this case in the form of a horizontal elevator, 117, and a pair of vertical rudders 115. Again, the outline of a prior aircraft (in this case, the NASA/MIT D8) is shown as dotted lines α. As can be seen, the provision of the tapered portions reduces the overall length of the aircraft, while providing substantially symmetric flow to the inlets of the propellers 136.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, further tapering portions could be provided. Where a pair of tapering portions are provided, the tapering portions could be provided in a vertically stacked arranged, with the bifurcation being through the vertical plane. Where two gas turbines are provided, the first gas turbine may employ a different thermodynamic cycle to the second gas turbine. For example, the first gas turbine engine may comprise a simple cycle gas turbine engine, while the second gas turbine engine may comprise a recuperated cycle gas turbine engine. Alternatively, both gas turbine engines could comprise a recuperated cycle gas turbine engine. This is possible in the described design, since the increased volume provided by the first and second inwardly tapering portions allows for more complex gas turbine engines to be provided. In a still further alternative, the boundary layer ingesting propulsors could be electrically driven. The aircraft could include a further structural element projecting from a lower surface of the tail, to prevent the propellers from contact with the ground in the eve of over-rotation on takeoff or landing. Ducted fans could be employed in place of open rotor propellers.

The invention claimed is:

1. An aircraft having a central axis along a longitudinal direction of the aircraft, the aircraft comprising:
    a fuselage including a main portion and a tail end portion, the tail end portion including a bifurcation that divides the fuselage along the central axis into at least a first inwardly tapering portion and a second inwardly tapering portion at an aft end of the fuselage, the first inwardly tapering portion and the second inwardly tapering portion each including at least one surface tapering inward towards the central axis relative to the main portion in both a width direction and a height direction of the aircraft, which are each orthogonal to the longitudinal direction; and
    a boundary layer ingesting propulsor mounted on each of the first inwardly tapering portion and the second inwardly tapering portion of the tail end portion of the fuselage.

2. The aircraft according to claim 1, wherein each of the first inwardly tapering portion and the second inwardly tapering portion extends from approximately a same longitudinal position.

3. The aircraft according to claim 1, wherein the first inwardly tapering portion and the second inwardly tapering portion are arranged parallel to one another in a same horizontal plane.

4. The aircraft according to claim 1, wherein the first inwardly tapering portion and the second inwardly tapering portion are arranged parallel to one another in a same vertical plane.

5. The aircraft according to claim 1, wherein each propulsor is driven by a respective gas turbine engine.

6. The aircraft according to claim 1, wherein at least two propulsors are driven by a common gas turbine engine core.

7. The aircraft according to claim 6, wherein each propulsor is driven by a respective turbine driven by exhaust gases from a common gas generator.

8. The aircraft according to claim 5, wherein each gas turbine engine includes a core flow inlet arranged to ingest one of a boundary layer air and a freestream air.

9. The aircraft according to claim 1, further comprising:
    a third inwardly tapering portion extending from the aft end of the fuselage, and
    a boundary layer ingesting propulsor mounted on the third inwardly tapering portion, wherein:
        each of the first inwardly extending tapering portion, the second inwardly tapering portion, and the third inwardly tapering portion extend from a same longitudinal position.

10. The aircraft according to claim 1, wherein each of the first inwardly tapering portion and the second inwardly tapering portion includes a non-axisymmetric portion upstream of an inlet of the respective propulsor, the non-axisymmetric portion defining a twist in an opposite sense to a rotational direction of a propulsor fan or a propeller.

11. The aircraft according to claim 1, wherein the fuselage includes at least one guide vane located upstream of at least one propulsor inlet.

* * * * *